(12) United States Patent
Harada

(10) Patent No.: US 10,217,232 B2
(45) Date of Patent: Feb. 26, 2019

(54) SYSTEMS AND METHODS FOR LOCALLY ALIGNING MAP DATA

(71) Applicant: Toyota Motor Engineering & Manufacturing North America, Inc., Erlanger, KY (US)

(72) Inventor: Masahiro Harada, Novi, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 88 days.

(21) Appl. No.: 15/427,263

(22) Filed: Feb. 8, 2017

(65) Prior Publication Data

US 2018/0225835 A1 Aug. 9, 2018

(51) Int. Cl.
*G06T 7/33* (2017.01)
*G05D 1/02* (2006.01)
*G01C 21/34* (2006.01)
*G06T 7/11* (2017.01)
*G06T 7/32* (2017.01)
*G01C 21/32* (2006.01)

(52) U.S. Cl.
CPC .............. *G06T 7/337* (2017.01); *G01C 21/32* (2013.01); *G01C 21/34* (2013.01); *G05D 1/0274* (2013.01); *G05D 1/0276* (2013.01); *G05D 1/0278* (2013.01); *G06T 7/11* (2017.01); *G06T 7/32* (2017.01)

(58) Field of Classification Search
USPC .......................................................... 701/23
See application file for complete search history.

(56) References Cited

U.S. PATENT DOCUMENTS

| 8,396,325 | B1* | 3/2013 | Kwatra ..................... G06T 7/33 382/284 |
| 8,571,349 | B1 | 10/2013 | Kwatra et al. |
| 8,588,547 | B2 | 11/2013 | Giuffrida et al. |
| 8,994,822 | B2 | 3/2015 | Smitherman et al. |
| 9,058,673 | B2 | 6/2015 | Chen et al. |
| 9,177,404 | B2 | 11/2015 | Ramachandran et al. |
| 9,202,259 | B2 | 12/2015 | Padwick et al. |
| 9,916,652 | B2* | 3/2018 | Weinberg ................ G06T 7/194 |

* cited by examiner

*Primary Examiner* — Lail A Kleinman
*Assistant Examiner* — Mahmoud M Kazimi
(74) *Attorney, Agent, or Firm* — Christopher G. Darrow; Darrow Mustafa PC

(57) ABSTRACT

System, methods, and other embodiments described herein relate to locally aligning features within a map. In one embodiment, a method includes segmenting map data that forms the map using a first grid to divide the map into a first set of tiles and a second grid to divide the map into a second set of tiles that are offset and overlap the first set of tiles. The method includes analyzing neighbor tiles in relation to a patch tile based, at least in part, on shared features between the patch tile and the neighbor tiles to identify external misalignments between one or more of the neighbor tiles and the patch tile. The neighbor tiles are from a different one of the first grid and the second grid. The method includes adjusting alignment of the neighbor tiles within the map according to the external misalignments for the neighbor tiles.

19 Claims, 11 Drawing Sheets

SYSTEMS AND METHODS FOR LOCALLY ALIGNING MAP DATA

TECHNICAL FIELD

The subject matter described herein relates in general to systems and methods for correcting errors within map data and, more particularly, to segmenting a map into separate grids and tiles of the separate grids to locally align the map data.

BACKGROUND

Autonomously controlling a vehicle is a complex task that includes many different aspects. As one example, for a vehicle to operate autonomously, the vehicle generally uses multiple different sensors to gather information about surroundings continuously. The vehicle analyzes the gathered data to produce a representation of the present environment that the vehicle uses to, for example, plan a route, avoid obstacles, navigate, and so on. However, while the vehicle can gather the information about the surroundings and generally produce the representation, this can be a computationally intensive effort that the vehicle may not be equipped to perform in an adequate timeframe. Moreover, the representation produced by the vehicle may include errors that can cause difficulties when using the provided representation for various tasks.

Thus, in various implementations, the vehicle also uses a map of a local region in addition to the gathered information to provide a more concise representation of the surrounding environment. The map can be a topological or other type of map that includes information gathered by other vehicles over multiple passes through various locations depicted by the map. Generally, this map is obtained from, for example, a central repository or other source that combines the information together into a global view. That is, the map may be derived from the underlying data in order to provide a globally consistent representation of the region. However, this approach generally results in a map that can be locally inaccurate. For example, the map may generally align with highways and other landmarks across a wide region, but locally the map may not be accurately aligned with lane markers at an intersection, precise locations of off-ramps, and so on. Accordingly, when the vehicle uses the map for various autonomous operations, difficulties may arise from the inaccuracies within the map.

SUMMARY

An example of a map alignment system that locally aligns tiles of a map using two offset grids is presented herein. In one embodiment, the map alignment system segments the map into a first grid and a second grid. The second grid is generally offset from the first grid, so that resulting map tiles of each grid overlap in part. The map alignment system undertakes an alignment process to locally align each of the tiles by, for example, selecting a patch tile from the first grid as a focus of the local alignment. Thereafter, the map alignment system loads neighboring tiles from the second grid that overlap with the patch tile. The neighboring tiles are each analyzed in relation to the patch to identify external misalignments that are inter-tile inaccuracies between the patch tile and the neighboring tiles. Subsequently, the map alignment system can adjust a location for each of the neighboring tiles according to the external misalignment.

In one embodiment, a map alignment system for locally aligning map data of a map is disclosed. The map alignment system includes one or more processors and a memory that is communicably coupled to the one or more processors. The memory stores a segmenting module including instructions that when executed by the one or more processors cause the one or more processors to segment the map data that forms the map using a first grid to divide the map into a first set of tiles and a second grid to divide the map into a second set of tiles that are offset and overlap the first set of tiles. The memory stores an alignment module including instructions that when executed by the one or more processors cause the one or more processors to analyze neighbor tiles in relation to a patch tile based, at least in part, on shared features between the patch tile and the neighbor tiles to identify external misalignments between one or more of the neighbor tiles and the patch tile. The neighbor tiles are from a different one of the first grid and the second grid in relation to the patch tile and overlap with the patch tile. The alignment module includes instructions to adjust alignment of the neighbor tiles within the map according to the misalignments for the one or more of the neighbor tiles.

In one embodiment, a non-transitory computer-readable medium is disclosed. The computer-readable medium stores instructions that when executed by one or more processors cause the one or more processors to perform the disclosed functions. The instructions include instructions to segment map data that forms a map using a first grid to divide the map into a first set of tiles and a second grid to divide the map into a second set of tiles that are offset and overlap the first set of tiles. The instructions include instructions to analyze neighbor tiles in relation to a patch tile based, at least in part, on shared features between the patch tile and the neighbor tiles to identify external misalignments between one or more of the neighbor tiles and the patch tile. The neighbor tiles are from a different one of the first grid and the second grid in relation to the patch tile and overlap with the patch tile. The instructions include instructions to adjust alignment of the neighbor tiles within the map according to the misalignments for the one or more of the neighbor tiles.

In one embodiment, a method of locally aligning features within a map is disclosed. The method includes segmenting map data that forms the map using a first grid to divide the map into a first set of tiles and a second grid to divide the map into a second set of tiles that are offset and overlap the first set of tiles. The method includes analyzing neighbor tiles in relation to a patch tile based, at least in part, on shared features between the patch tile and the neighbor tiles to identify external misalignments between one or more of the neighbor tiles and the patch tile. The neighbor tiles are from a different one of the first grid and the second grid in relation to the patch tile and overlap with the patch tile. The method includes adjusting alignment of the neighbor tiles within the map according to the external misalignments for the neighbor tiles.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with locally aligning tiles of a map are disclosed. As mentioned in the background, a vehicle may use a map as one source of information about a surrounding environment when operating autonomously. However, as also noted, the map can include inaccuracies associated with being globally aligned instead of being locally aligned. These inaccuracies may manifest as inaccurate lane marker positions, landmark positions, and so on. In either case, because the different features can be represented incorrectly within the map, the inaccuracies can be extrapolated to various tasks executed by the vehicle when operating autonomously (e.g., obstacle avoidance, trajectory planning, etc.).

Therefore, in one embodiment, a map alignment system locally aligns a map to correct the noted inaccuracies. For example, the map alignment system initially divides the map into two offset grids. That is, the map alignment system segments the map into a first grid and into a second grid that is offset from the first grid. Each of the grids divides the map into separate tiles with tiles of each respective grid overlapping the other grid. In one example, a tile of the first grid is overlapped by at least four tiles of the second grid with each overlap being about a quarter of the underlying tile of the first grid.

Once the map has been divided into the two grids, the map alignment system can, for example, execute one or more optimization processes on the tiles to correct internal misalignments. That is, because each of the tiles is comprised of data gathered from separate acquisition events (e.g., separate passes through an area), the map alignment system may initially attempt to correct misalignments internally within the tiles and without reference to neighboring tiles.

Thereafter, the map alignment system analyzes the tiles of one grid with respect to tiles of the other grid. For example, the map alignment system selects a patch tile from the first grid and determines which of the tiles from the second grid overlap the patch tile. The overlapping tiles of the second grid are referred to as neighbor tiles. The map alignment system analyzes the neighbor tiles with respect to the patch tile to determines external misalignments that embody inter-tile alignment errors. Accordingly, the map alignment system can use the external misalignments to adjust each of the neighbor tiles and, thus, to correct the misalignments through analyzing partially overlapping neighbor tiles. In this way, the map alignment system provides for locally aligning elements within the map to provide for an accurate depiction of a local region from a local perspective.

Figure 1:
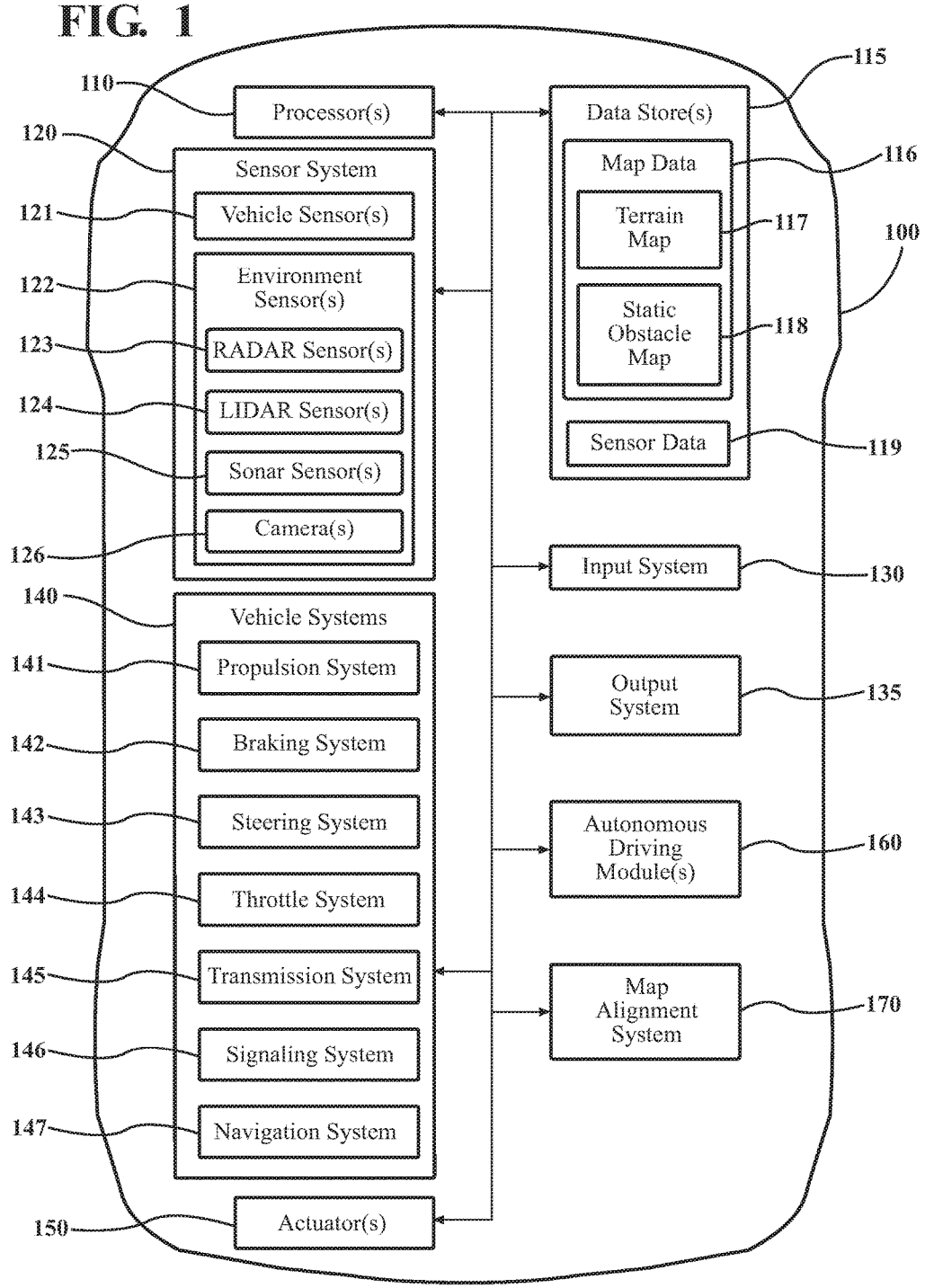
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that uses a map.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-12 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a map alignment system 170 that is implemented to perform methods and other functions as disclosed herein relating to correcting misalignments in map data 260 by dividing the map data 260 into at least two separate grids and optimizing tiles formed from the respective grids both internally and externally in relation to neighboring tiles. The noted functions and methods will become more apparent with a further discussion of the figures. Moreover, it should be appreciated that while the map alignment system 170 is discussed in relation to being integrated with the vehicle 100 of FIG. 1, in one embodiment, the map alignment system 170 is separate from the vehicle 100 and can be provided as a cloud-based service, software as a service (SaaS), a standalone server-based system, and so on.

Figure 2:
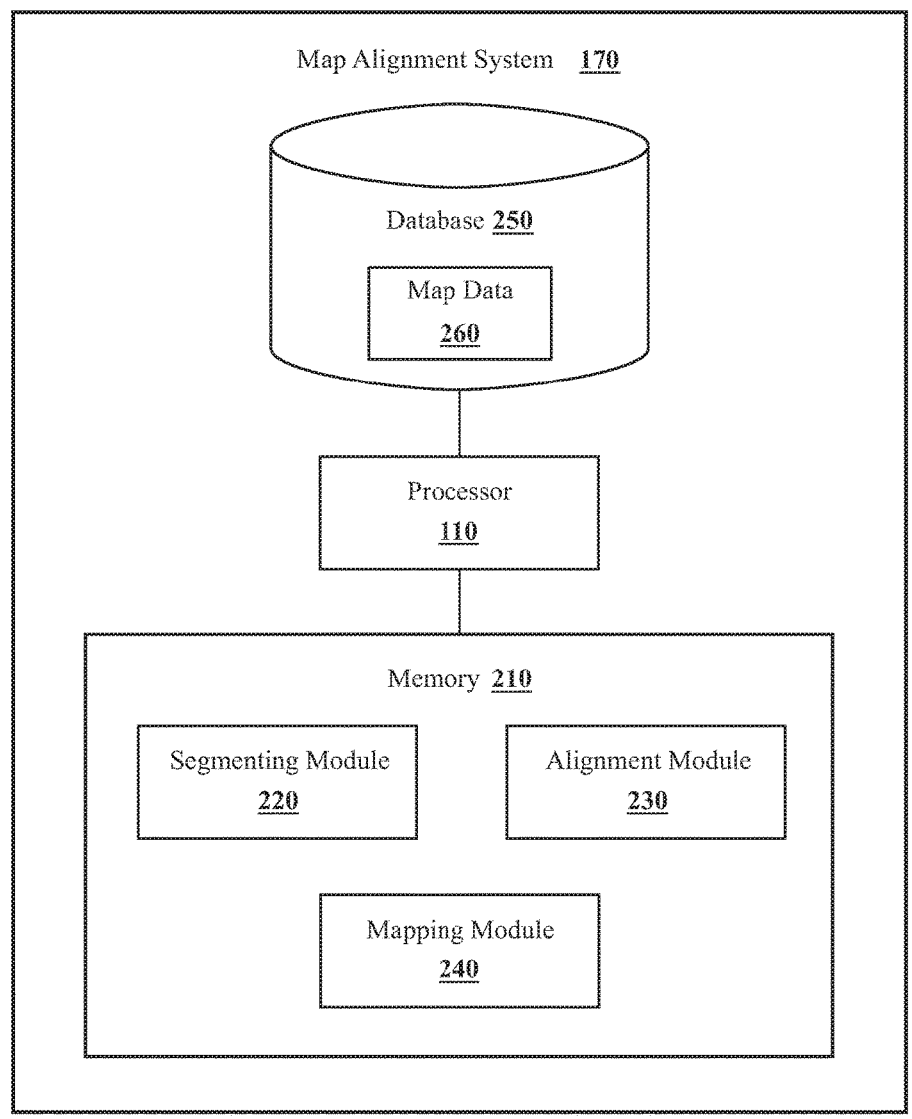
FIG. 2 illustrates one embodiment of a map alignment system that is associated with locally aligning tiles within a map using two separate grids.

With reference to FIG. 2, one embodiment of the map alignment system 170 of FIG. 1 is further illustrated. The map alignment system 170 is shown as including the processor 110 from the vehicle 100 of FIG. 1. Accordingly, the processor 110 may be a part of the map alignment system 170, the map alignment system 170 may include a separate processor from the processor 110 of the vehicle 100 or the map alignment system 170 may access the processor 110 through a data bus or another communication path. In one embodiment, the map alignment system 170 includes a memory 210 that stores a segmenting module 220, an alignment module 230, and a mapping module 240. The memory 210 is a random-access memory (RAM), read-only memory (ROM), a hard-disk drive, a flash memory, or other suitable memory for storing the modules 220, 230, and 240. The modules 220, 230, and 240 are, for example, computer-readable instructions that when executed by the processor 110 cause the processor 110 to perform the various functions disclosed herein.

Accordingly, the segmenting module 220 generally includes instructions that function to control the processor 110 to divide a map into separate tiles. In general, the segmenting module 220 uses horizontal and vertical dividing lines that are generally perpendicular so that the formed tiles are substantially square or at least rectangular in shape. Moreover, the segmenting module 220, in one embodiment, segments the map using a Cartesian coordinate system, which can include the Universal Transverse Mercator (UTM) conformal projection or another suitable coordinate system to divide the map into evenly shaped tiles. Furthermore, the segmenting module 220 divides the map into, for example, at least two separate grids.

Accordingly, the segmenting module 220 produces a first set of tiles associated with a first grid and a second set of tiles associated with a second grid. The segmenting module 220 generally divides the map to produce the two grids and associated tiles such that the first set of tiles and the second set of tiles are offset and partially overlap. Additional details of the tiles will be provided subsequently in relation to the discussion of correlating figures.

With further reference to FIG. 2, in one embodiment, the alignment module 230 includes instructions that function to control the processor 110 to optimize the tiles defined by the segmenting module 220 in a multi-part process. For example, the alignment module 230 optimizes the tiles by smoothing inaccuracies or otherwise aligning features within the tiles to correct inaccurate map data. Accordingly, in one embodiment, the alignment module 230 can optimize the map data of the tiles on a tile-by-tile basis (intra-tile) and/or using relationships between tiles from the separate grids (inter-tile).

In one embodiment, the alignment module 230 initiates optimization when the tiles are divided into grid structures defined by the first grid and the second grid and, for example, loaded into a memory (e.g., the memory 210). For example, the alignment module 230 first identifies internal misalignments within each of the tiles and separately adjusts each tile to at least partially correct the internal misalignments. In one example, the alignment module 230 applies a simultaneous localization and alignment (SLAM) process, a smoothing and alignment (SAM) process or another suitable process to each of the tiles to identify and correct the internal misalignments.

In general, the internal misalignments are a result of overlaying data from multiple sources to produce the map and thus the data that comprises each tile. That is, each of the tiles includes data from separate sources that is, for example, gathered from multiple passes through an area represented by a tile. Consequently, data that comprises the tile may not be accurately aligned. Moreover, because the map may be produced to maintain global consistency between features across a wide area, the features may exhibit local misalignment. Accordingly, the alignment module 230 can initially correct at least a portion of the internal misalignment by analyzing each tile internally and adjusting tiles accordingly.

Furthermore, the alignment module 230 also performs inter-tile analysis and adjustments. For example, the alignment module 230 can adjust a group of tiles according to the alignment of another tile (i.e., patch tile) that is used for comparative purposes. Thus, the alignment module 230 selects a patch from one of the grids (e.g., first grid) and then identifies neighbor tiles from the other grid (e.g., the second grid). The alignment module 230 identifies the neighbor tiles as tiles that overlap with the patch tile. In this way, the alignment module 230 can compare shared features between the patch tile and neighbor tiles to identify misalignments and to adjust the neighbor tiles to correct the misalignments.

With continued reference to the map alignment system 170, in one embodiment, the system 170 includes a database 250. The database 250 is, in one embodiment, an electronic data structure stored in the memory 210, a distributed memory, a cloud-based memory, or another data store and that is configured with routines that can be executed by the processor 110 for analyzing stored data, providing stored data, organizing stored data, and so on. Thus, in one embodiment, the database 250 stores data used by the modules 220, 230 and 240 in executing various determinations.

In one embodiment, the database 250 stores map data 260. Alternatively, the map alignment system 170 stores the map data 260 in the memory 210, a specialized data structure (e.g., tree, etc.), a cache memory, or another suitable data storage component. In either case, the map data 260 defines features and other elements that comprise a map. In one embodiment, the map data 260 is data of a topological map that includes lane markers, roadways, traffic signs, geographic elements, and other geospatial elements. In general, elements included within the map data 260 can be elements that are generally useful when, for example, autonomously controlling a vehicle. Thus, in one embodiment, the map data 260 includes objects and features such as obstacles, indications of lanes and roadways, traffic lights and signs, and so on. Accordingly, the map data 260 may omit some metadata from the map such as local attractions, and so forth which is instead maintained within the navigation system 147. Moreover, while map data 116 is illustrated separately in FIG. 1, in one embodiment, the map data 116 and the map data 260 can be stored together as a common data set.

Furthermore, the map alignment system 170, in one embodiment, obtains the map data 260 through a secondary service that collects information about various geographic locations. Alternatively, or additionally, in one embodiment, the map alignment system 170 acquires at least a portion of the map data 260 using various sensors integrated with the vehicle 100. In either case, the mapping module 240 includes instructions that cause the processor 110 to load and use the map data 260 for navigating, detecting obstacles and, generally, for performing other functions in relation to operating the vehicle 100 and/or to operating the vehicle autonomously.

In one embodiment, the mapping module 240 uses the optimized map data 260 produced by the alignment module 230 to locate the vehicle 100. For example, as the vehicle 100 travels along a route, the mapping module 240 determines which of the tiles is closest to the vehicle 100. That is, the mapping module 240 can determine a closest one of the tiles according to center points of the tiles in relation to the vehicle 100. The mapping module 240 can then load or otherwise use the closest tile for use by the vehicle 100. Additionally, the mapping module 240 can load neighbor tiles of the closest tile that are of a different grid than the closest tile. In this way, as the vehicle 100 progresses along a route, the mapping module 240 can switch between tiles of different grids that are preloaded to provide map data that is locally accurate.

Figure 3:
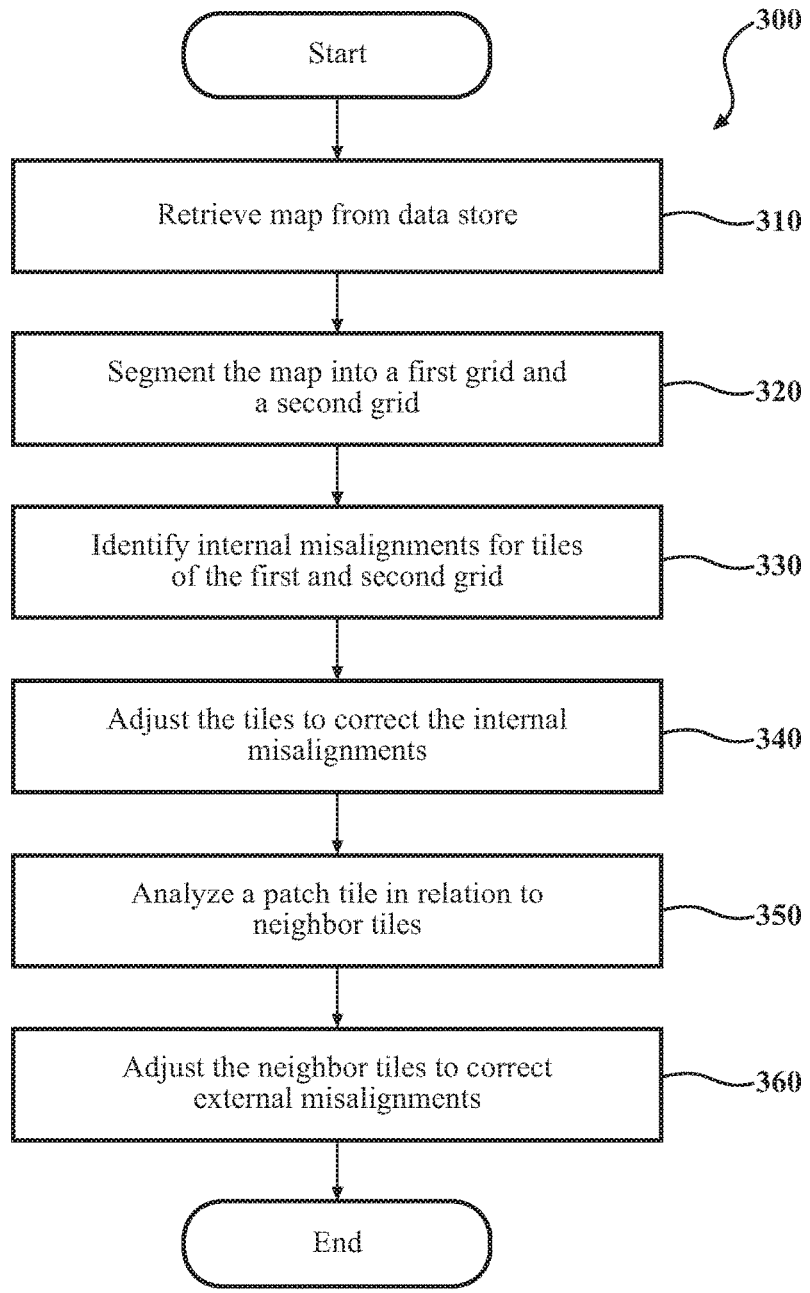
FIG. 3 illustrates one embodiment of a method that is associated with segmenting a map into at least two grids and using tiles of the grids to locally align map elements.

Additional aspects of locally aligning map data will be discussed in relation to FIG. 3. FIG. 3 illustrates a method 300 associated with locally aligning data of a map using at least two separate grids. Method 300 will be discussed from the perspective of the map alignment system 170 of FIGS. 1 and 2. While method 300 is discussed in combination with the map alignment system 170, it should be appreciated that the method 300 is not limited to being implemented within the map alignment system 170 or the vehicle 100, but is instead one example of a system that may implement the method 300. Moreover, FIGS. 4-6 will also be discussed along with method 300 of FIG. 3 to provide an illustrative example of how method 300 and the map alignment system 170 can operate.

At 310, the segmenting module 220 retrieves the map data 260 from the database 250. In one embodiment, the segmenting module 220 retrieves the map data 260 of the map and stores the map data 260 in, for example, sections/regions so that the map alignment system 170 can align the map data for a particular region or locality. In one example, the segmenting module 220 loads a section of map into a cache or other working memory so that the map data 260 associated with the section can be modified efficiently without prolonged accesses to a distributed or other remote data store. In either case, the segmenting module 220 accesses the map data 260 which is comprised of, in one embodiment, topological map data, grid map data, and/or another suitable form of map data for representing a geographic region for use by the vehicle 100 when, for example, operating autonomously.

Once the segmenting module 220 retrieves the map data 260, the segmenting module 220 segments the map data 260 using a first grid and a second grid, at 320. In one embodiment, the segmenting module 220 divides the map formed from the map data 260 into two offset groups of tiles using the first grid and the second grid. For example, the segmenting module 220 divides the map using the first grid to produce a first set of tiles. Thereafter, the segmenting module 220 divides the map again using the second grid which is offset from the first grid to produce a second set of tiles that overlap with the first set of tiles and are offset.

Figure 4:
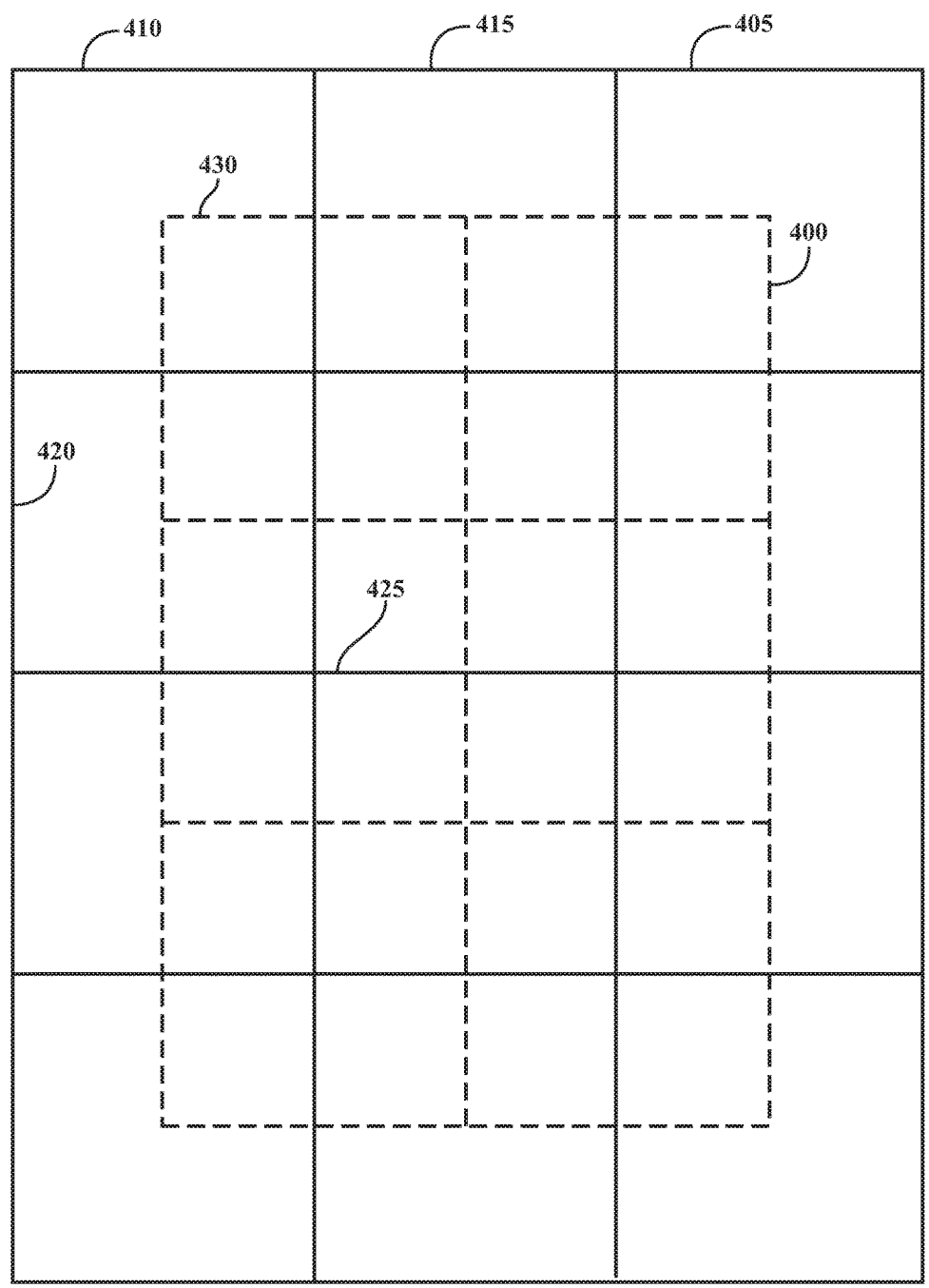
FIG. 4 is a diagram of an example grid structure of a map that is divided into two separate grids.

As one example, briefly consider FIG. 4, which illustrates a portion of a map that has been divided into two offset grids 400 and 405. The first grid 400 is illustrated as being divided into twelve distinct tiles while the second grid 405 is illustrated as being divided into nine distinct tiles. The provided number of tiles is provided for purposes of illustration only. Moreover, the segmenting module 220 generally divides the map into tiles of equivalent sizes. In other words, the segmenting module 220 evenly spaces horizontal and vertical lines of the grids in order to produce tiles that are substantially similar in size and shape.

Additionally, while tiles of the first set and the second set are generally discussed as being of similar size and shape, in various embodiments, the segmenting module 220 may be implemented to generate tiles from the grids that are of different sizes and/or shapes according to particular aspects of an implementation or particular characteristics of a region being mapped. In either case, the tiles are formed according to a grid structure of the first grid and the second grid to overlap and to be generally offset such that one tile does not completely fall within a boundary of another single tile. For example, the tiles, as illustrated in FIG. 4, generally overlap by about twenty-five percent of an area of each respective tile.

Furthermore, as previously noted, the segmenting module 220 defines the first grid and the second grid by using horizontal and vertical lines to divide the map data 260. The segmenting module 220 can define the horizontal and vertical lines according to existing coordinates systems (e.g., longitude and latitude) or according to a custom coordinate system that is defined according to constraints of a particular map section. Thus, each of the tiles defined by the first and second grids are produced by the segmenting module 220 to define a distinct submap within the overall map and thus are each comprised of separate portions of the map data 260 which may be redundant, in part, where two or more tiles overlap.

At 330, the alignment module 230 identifies internal misalignments for tiles of the first set and of the second set. In one embodiment, the alignment module 230 executes one or more optimization processes at 330 to correct misalignments within the data that is present from layering data gathered from separate scans of the various locations within each tile. That is, as a vehicle, robot, or other scanning device navigates locations represented by a particular tile over multiple iterations, the data that is gathered can be layered to generate a representation of those locations. However, because of various errors in the gathered data internal misalignments may exist within data of each tile. As a result, the alignment module 230 identifies the internal misalignments for each of the tiles at 330 by using, in one embodiment, a smoothing and mapping (SAM) function or another suitable approach.

At 340, the alignment module 230 adjusts the tiles of the first set and the second set according to the identified internal misalignments. In one embodiment, the alignment module 230 separately modifies each of the tiles to locally align separate data elements within the tiles so that the internal misalignments are at least partially corrected. In other words, the alignment module 230 can smooth or otherwise adjust the misaligned data elements so that an overall accuracy of the data for the tile is improved. As a result of the adjustments at 340, an individual tile may, for example, exhibit a greater degree of accuracy toward a center of the tile as opposed to near edges of the tile. This can be because of, for example, limited comparative data near edges of the tile. In either case, an overall internal accuracy/alignment of the tile is improved as a result of processing at blocks 330 and 340.

At 350, the alignment module 230 analyzes neighbor tiles in relation to a patch tile to identify external misalignment between the tiles. In one embodiment, the alignment module 230 initiates the analysis at 350 by selecting the patch tile as a tile that is to be the focus of the analysis. It should be appreciated that while a single patch tile is discussed at block 350, blocks 350 and 360 may, in one embodiment, be repeated for each of the tiles in the first set and the second set in order to locally align the map. Moreover, while two separate overlapping grids are discussed in relation to the map, each separate grid is comprised of, in one embodiment, independent data that is copied from an original data set. Thus, each tile comprises data that is independent of data in an overlapping portion of tiles from a different grid. In either case, the alignment module 230 selects the patch tile from, for example, the second set of tiles. Thereafter, the alignment module 230 determines neighbor tiles for the patch tile. The neighbor tiles are tiles from a different grid (e.g., the first grid in the instant example) that overlap with the patch tile.

A shown in FIG. 4-5, when the alignment module 230 selects the tile 430 of the second grid 405 as the patch tile, then the alignment module 230 would subsequently identify the tiles 410, 415, 420, and 425 of the first grid 400 as the neighbor tiles. In either case, the neighbor tiles are from a different grid than the patch tile 430 and at least partially overlap with the patch tile 430. Additionally, while four neighbor tiles are illustrated, in alternative implementations, the number of neighbor tiles can vary according to a particular configuration of the respective grids and of the offset between the first grid and the second grid.

The alignment module 230 proceeds, at block 350, by separately analyzing each of the neighbor tiles in relation to the patch tile. In one embodiment, the alignment module 230 performs the noted analysis based, at least in part, on shared features between the patch tile and the neighbor tiles to identify the external misalignments and an extent of the misalignments between each of the neighbor tiles and the patch tile. For example, where the patch tile and each of the neighbor tiles overlap, the alignment module 230 analyzes shared aspects within the region of overlap. That is, the alignment module 230, in one embodiment, determines an extent to which the same features between the patch tile and one of the neighbor tiles do not accurately align to identify a degree of the external misalignments. The alignment module 230 performs this comparison for each of the neighbor tiles to determine respective degrees of misalignment. In this way, the alignment module 230 uses shared aspects of the patch tile and the neighbor tiles to determine whether a present alignment for each of the neighbor tiles correlates with the patch tile.

At 360, the alignment module 230 adjusts the alignment of the neighbor tiles within the map according to the degree of misalignment for each of the neighbor tiles as determined at 350. In one embodiment, the alignment module 230 alters coordinates of the neighbor tiles according to the external misalignments for each of the neighbor tiles. Thus, the alignment module 230 uses locally identified errors between the patch tile and the neighbor tiles to reposition the neighbor tiles according to a coordinate system defined by the first grid and the second grid.

Figure 5:
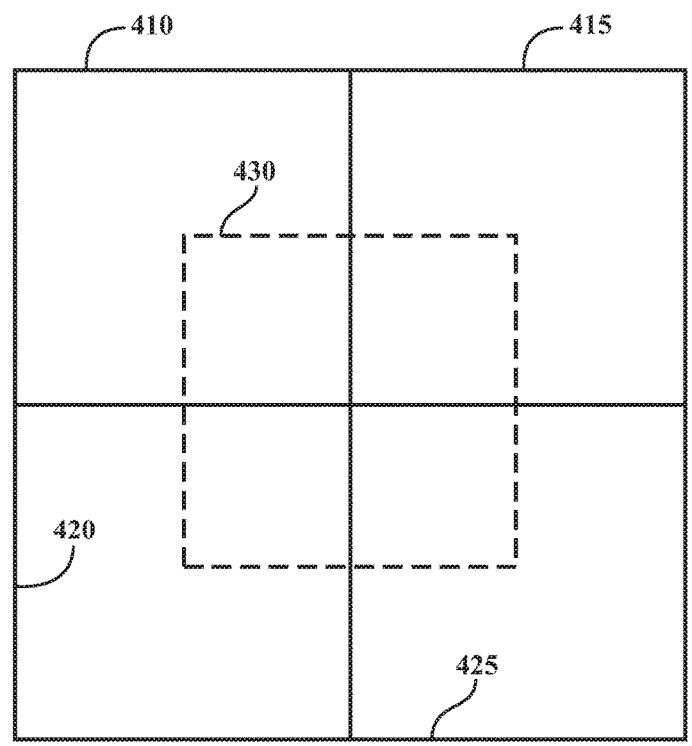
FIG. 5 is a diagram illustrating a patch tile with overlapping neighbor tiles of a map.
Figure 6:
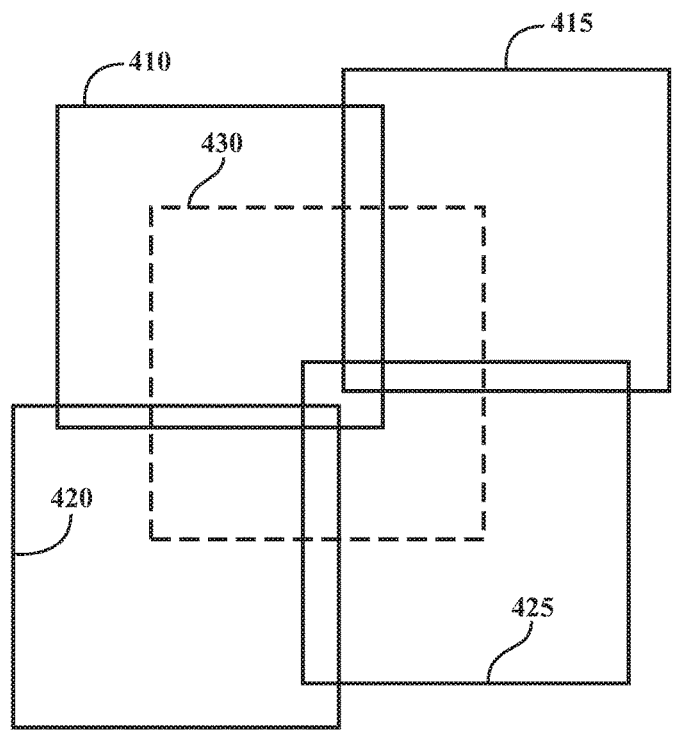
FIG. 6 is a diagram illustrating the patch tile and the neighbor tiles of FIG. 5 after being locally aligned.

As one example, consider FIG. 6 which illustrates the patch tile 430 of FIGS. 4 and 5. In FIG. 6, the neighbor tiles 410, 415, 420, and 425 have been adjusted as described. Thus, the positions of the neighbor tiles are altered from respective original locations of FIG. 5 in order to correct inaccuracies in alignment. As illustrated, the alignment module 230 has altered coordinates of the tiles 410, 415, 420, and 425 within the first grid 400 so that the tiles align with the patch tile 430. In this way, the alignment module 230 resolves errors in local alignment between neighbor tiles and within the tiles themselves to provide optimized tiles that facilitate, for example, autonomous operation of the vehicle 100.

Figure 7:
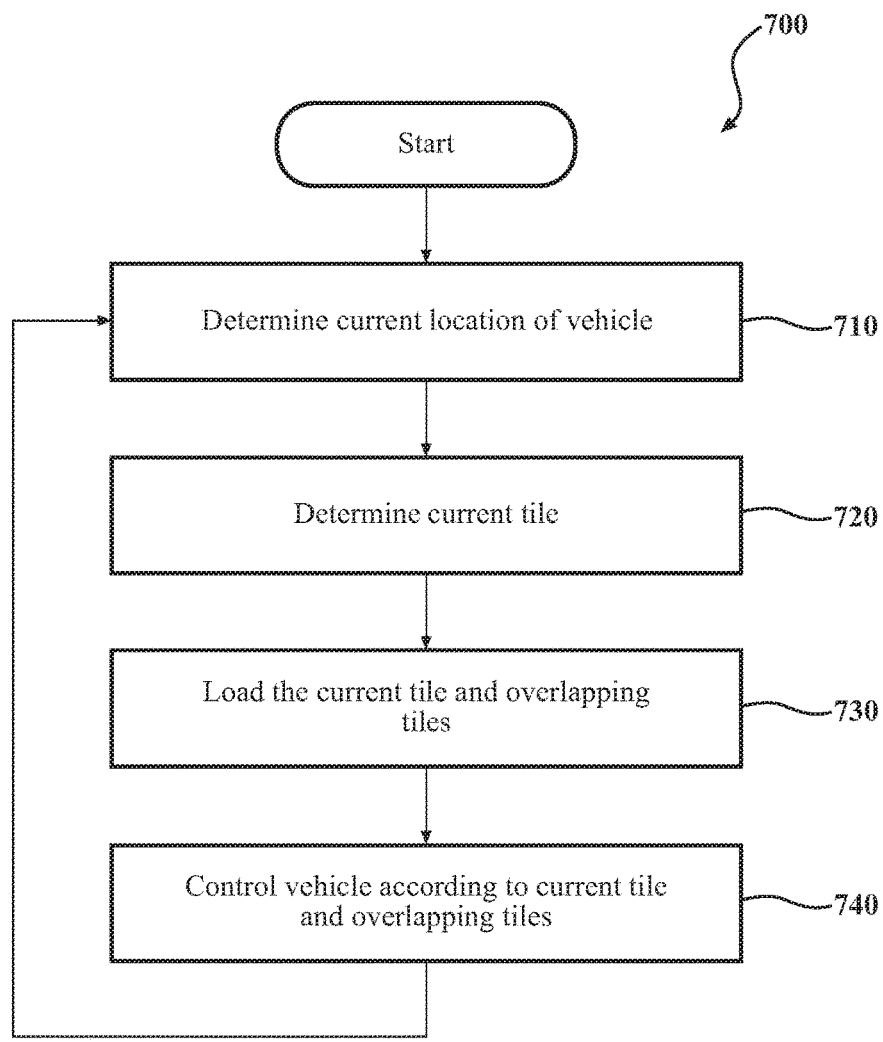
FIG. 7 illustrates one embodiment of a method that is associated with using a map that is divided into separate grid structures to load map tiles.

With reference to FIG. 7, one embodiment of how a vehicle can utilize a map that has been divided into two separate grids is illustrated. As with FIG. 3, FIG. 7 will be discussed from the perspective of the map alignment system 170 of FIGS. 1 and 2.

At 710, the mapping module 240 determines a current location/position of the vehicle 100. In one embodiment, the mapping module 240 determines the current location by communicating with a global position system (GPS) within the vehicle 100, and/or using various localization techniques to determine the current position of the vehicle 100, at 710.

Once the current position is resolved, the mapping module 240 determines a current tile of the map at 720. In one embodiment, the mapping module 240 uses a center point for each of the tiles to compare against the current position in order to resolve which tiles are closest to a position of the vehicle 100. In general, the mapping module 240 is aware of at least an isolated group of tiles that are candidates for the closest tile according to a lookup table or other manner of identifying map data against the current position of the vehicle 100. In either case, the mapping module 240 identifies the closest tile within the map as the current tile.

At 730, the mapping module 240 loads the closest tile and overlapping tiles. In one embodiment, the mapping module 240 loads the closest tile and the overlapping/neighbor tiles into a working memory such as the memory 210.

At 740, the mapping module 240 controls the vehicle 100 to navigate according to at least the closest tile and the overlapping tiles. Moreover, as the vehicle 100 progress through an area covered by the closest tile, the mapping module 240 proceeds back to block 710 where the position is once again determined. Because a center region of each tile is generally considered to be more accurate, as the vehicle 100 moves away from the center region of the closest tile which is part of, for example, the first grid, the mapping module 240 will designate a tile from the second grid as the closest tile at 720 and which was also previously loaded as an overlapping tile. This is the result of the general configuration of the two grids being offset in the manner as previously discussed. Moreover, this configuration results in the mapping module 240 using a tile in which the vehicle 100 is generally centered since by way of the overlaps between tiles transitions between neighbor tiles can occur before the vehicle 100 approaches an edge of any given tile. Thus, the general configuration of using two offset grids that are locally aligned ensures that the vehicle 100 is provided with an accurate depiction of a surrounding environment.

Figure 8:
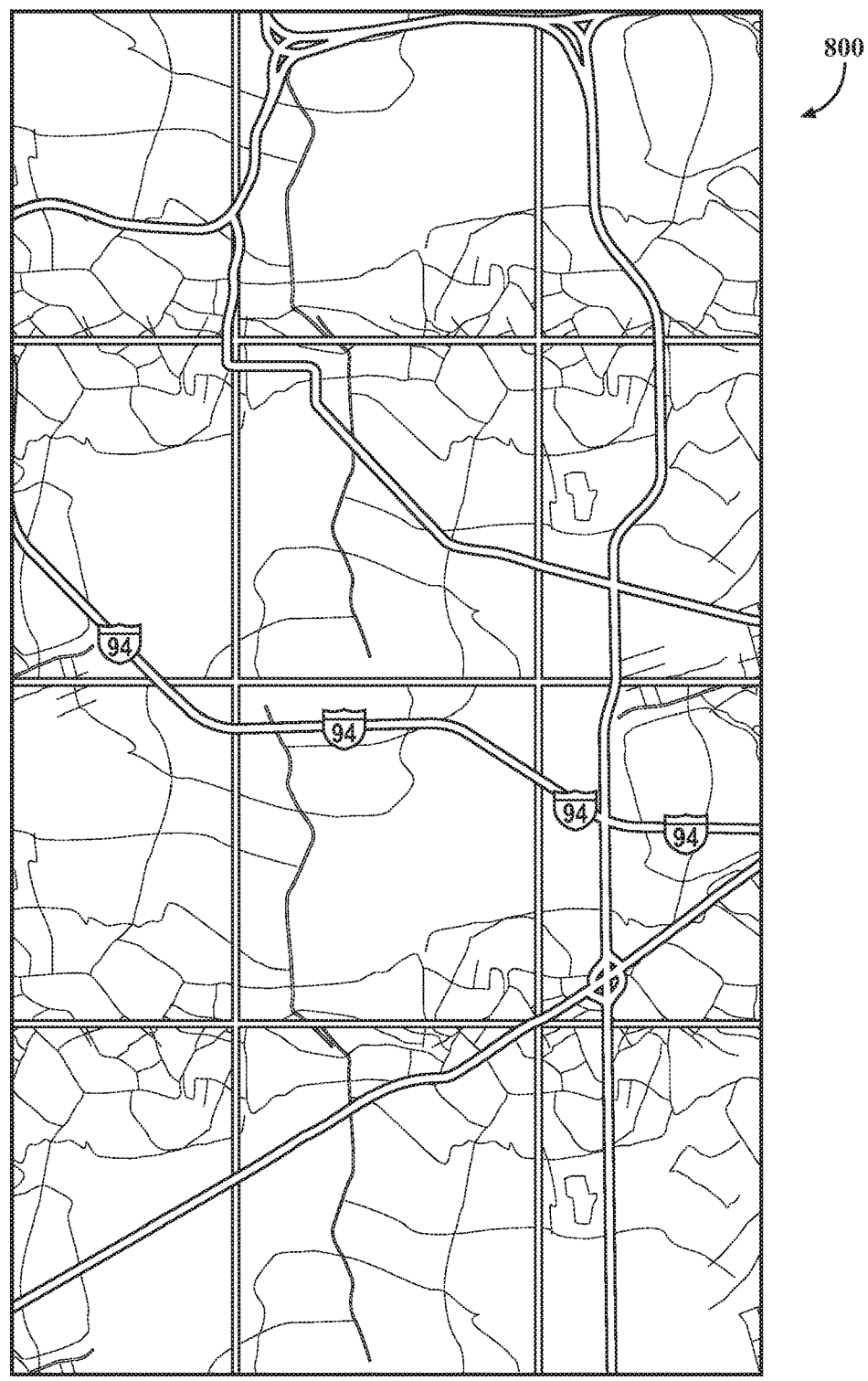
FIG. 8 illustrates an example cartographic map of a region.
Figure 9:
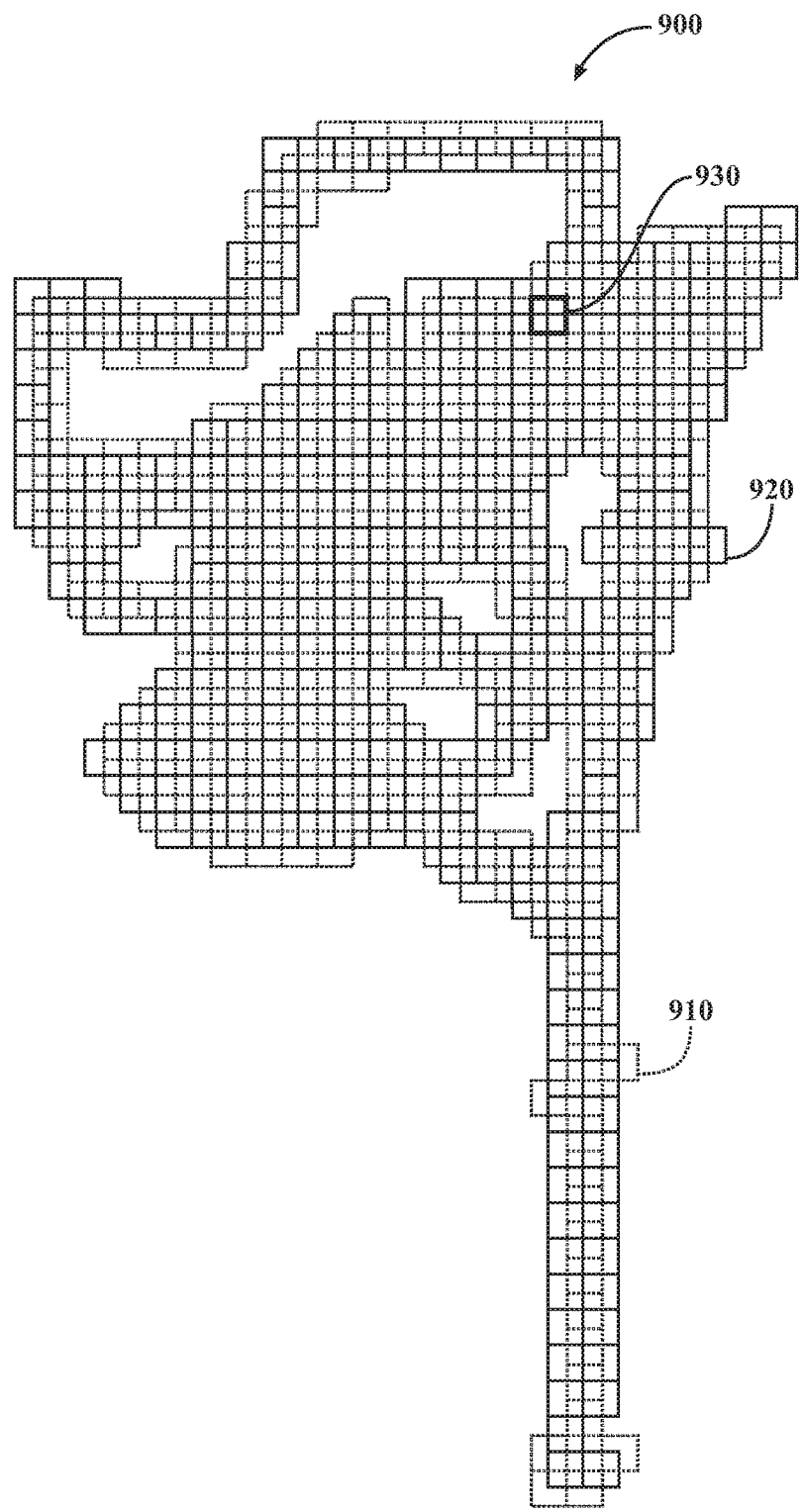
FIG. 9 illustrates an example map that has been divided into two separate grids.

As a further example of how the disclosed systems and methods operate consider the example illustrated in FIGS. 8-12. FIG. 8 illustrates a generic cartographic map of a region 800 as might be used by the navigation system 147 when providing general directions, identifying points of interest, and so on. By contrast, FIG. 9 illustrates a map 900 that corresponds to the region 800 of FIG. 8, but the map 900 is comprised of, for example, topological data as may be embodied by the map data 260.

As illustrated, the map 900 is divided into a first grid 910 and a second grid 920. In one embodiment, the segmenting module 220 produces separate grid structures for the first grid 910 and the second grid 920 to cover portions of the map 900 that are populated with data. In other words, if the map alignment system 170 does not have data for a particular region within the map 900, then the segmenting module 220 does not extend either grid to that region. Moreover, as generated in the example of the map 900 each tile with the respective grids 910 and 920 are substantially square and have dimensions of about 500 meters per side.

Once the segmenting module 220 divides the map 900 into the first grid 910 and the second grid 920, the alignment module 230, in one embodiment, executes processes as discussed in relation to blocks 330 and 340 of FIG. 3 to individually optimize the tiles relative to a pose within individual tiles. For example, the alignment module individually analyzes each of the tiles according to a simultaneous localization and mapping (SLAM) approach, according to a smoothing and mapping (SAM) approach, or according to another suitable approach in order to internally align data of each tile. In one embodiment, the alignment module 230 smooths data that has been overlayed to generate the map so that the data is internally consistent.

Figure 10A:
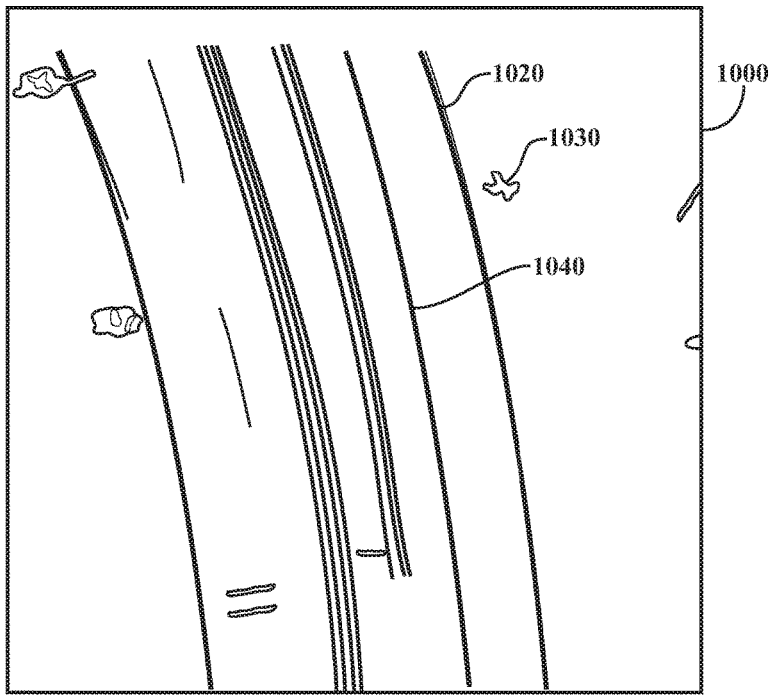
FIGS. 10A and 10B illustrate an example adjustment of internal misalignments of a tile.
Figure 10B:
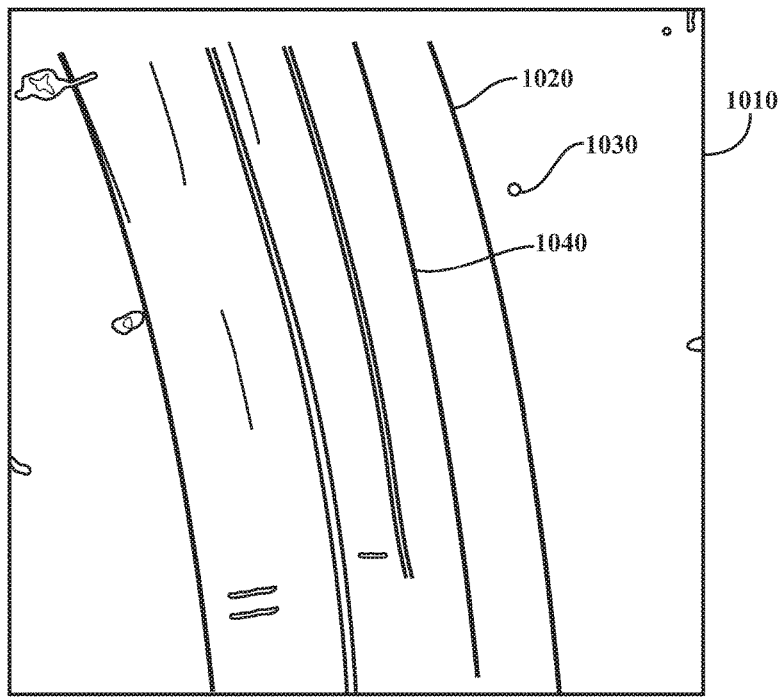

As one example, FIG. 10A and FIG. 10B illustrate before and after views of a zoomed-in portion of the patch tile 930 from FIG. 9. That is, FIG. 10A illustrates a view 1000 of the patch tile 930 prior to the alignment module 230 internally aligning data as discussed in relation to blocks 330 and 340. Accordingly, the view 1000 illustrates misalignments between road markers 1020, objects 1030, lane markers 1040 and other features of the map. In the view 1000 of the patch tile 930, the noted features are seen as being doubled and/or as being blurred. However, after the alignment module 230 corrects the internal misalignments, the view 1010 illustrates the noted features with an improved resolution/alignment. In this way, the alignment module 230 can correct errors internally within the tiles.

Continuing with the present example, the alignment module 230 initially selects one of the tiles from either the first grid 910 or the second grid 920 to designate as the patch tile. In the illustrated example of FIG. 9, the alignment module 230 selects the patch tile 930 from the first grid 910. In general, the alignment module 230 can select a patch tile for analysis according to any schema that is suitable for locally aligning tiles. For example, in one embodiment, the alignment module 230 iteratively selects patch tiles from a west to east and north to south manner. In another embodiment, the alignment module 230 dynamically selects a patch tile according to a current location of the vehicle 100, in a radiating pattern from a center location of the map, or according to another suitable schema in order to locally align the tiles.

Figure 11A:
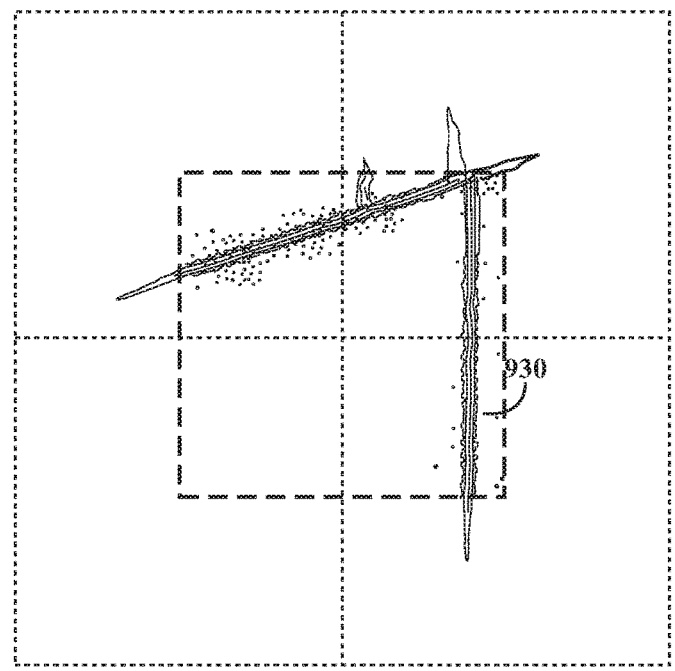
FIGS. 11A and 11B illustrate an example of a patch tile with neighbor tiles from the map of FIG. 9.
Figure 11B:
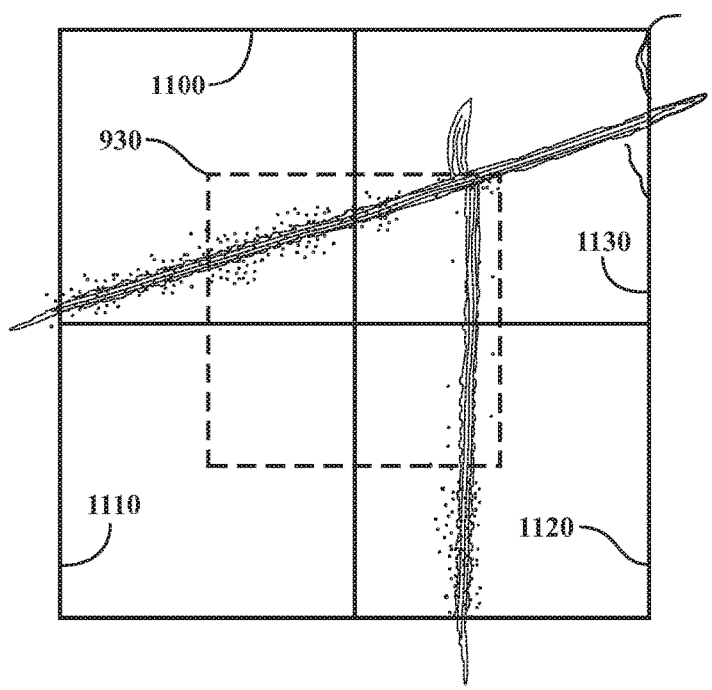

FIG. 11A illustrates a separate view of the patch tile 930. FIG. 11B illustrates the patch tile 930 along with neighbor tiles 1100, 1110, 1120, and 1130. As previously discussed, the alignment module selects a patch tile from one grid and the neighbor tiles from another grid. Accordingly, as illustrated, the alignment module 230 selected the patch tile 930 from the first grid 910 and the neighbor tiles 1100, 1110, 1120, and 1130 from the second grid 920. It should be appreciated that the alignment module 230 can select the patch tile from either grid and then determine the neighbor tiles from the opposite grid since the purpose is to identify and load tiles that are overlapping with the patch tile.

Figure 12A:
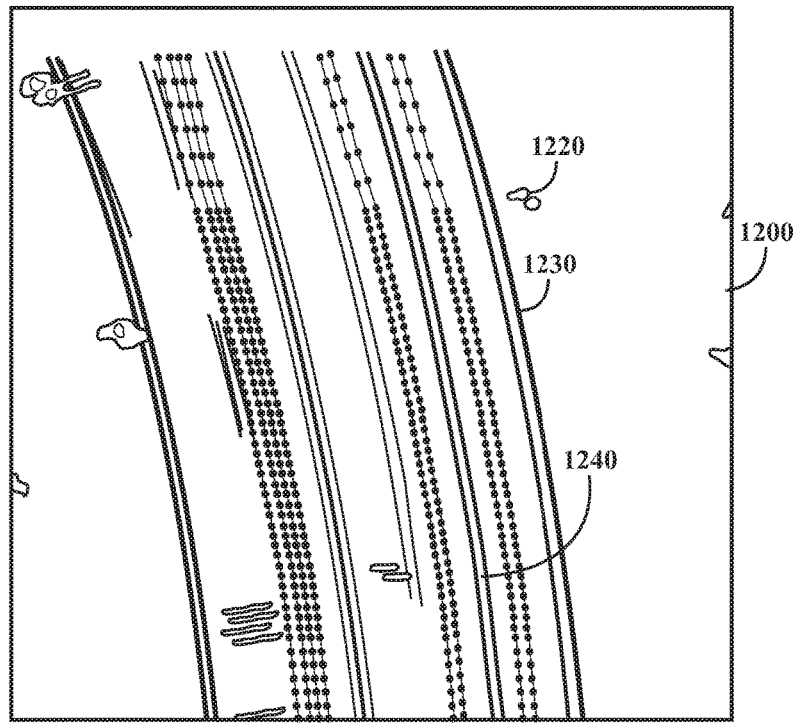
FIGS. 12A and 12B illustrate an example adjustment to correct external misalignments for a neighbor tile.
Figure 12B:
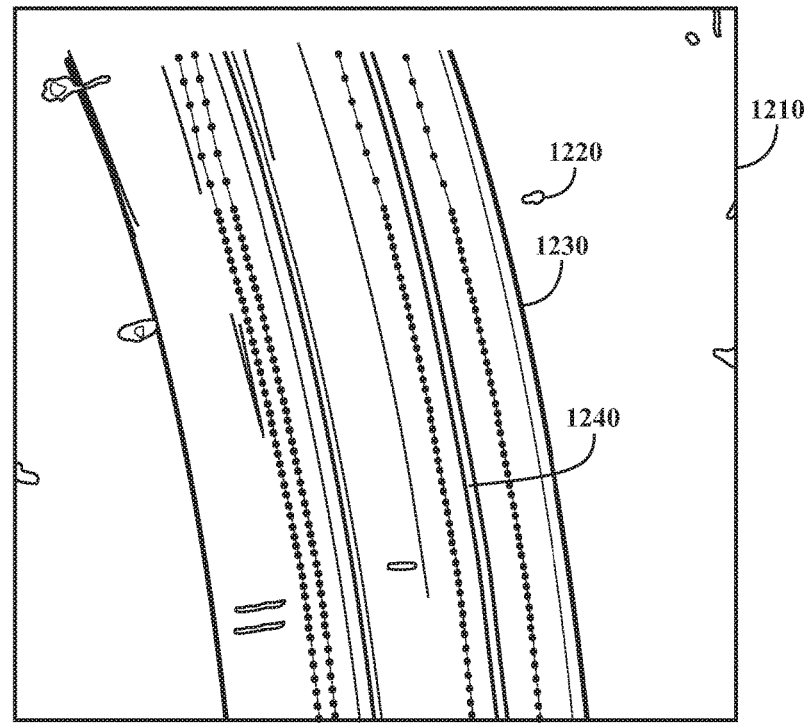

The alignment module 230 proceeds with analyzing the neighbor tiles 1100, 1110, 1120, and 1130 in relation to the patch tile 930 as discussed in relation to blocks 350 and 360 of method 300. FIG. 12A and FIG. 12B illustrate additional views of the region of the patch tile 930 shown in FIGS. 10A and 10B. The misalignments in features seen in FIG. 12A are a result of, for example, aligning the map to be globally consistent. That is, even though the alignment module 230 previously adjusted the tiles to correct for internal misalignments, because the tiles are aligned to be globally consistent with larger regional features that span many tiles, the alignment between separate tiles can still be inconsistent, thereby producing inter-tile/external misalignments as shown in FIG. 12A. It should be noted that the misalignments of FIG. 12A are generally a product of how separate tiles are aligned across the map 900. Thus, where two tiles overlap misalignments between features can occur from two overlapping sets of data of the two separate tiles.

As illustrated in FIG. 12A, the overlapping tiles are the patch tile 930 and the neighbor tile 1130. Accordingly, misalignments between the tiles as a result of providing global consistency across the map 900 manifests as blurred features, doubled marker lines, redundant objects, and so on. As illustrated in FIG. 12A, object 1220 is misaligned between tiles and is thus represented as two separate points in view 1200. Moreover, road marker 1230 is illustrated as a double line in the view 1200 while lane marker 1240 is illustrated as a dual-line as well. However, once the alignment module 230 analyzes the neighbor tile 1130 and adjusts an alignment of the neighbor tile 1130 in relation to the patch tile 930, the double lines and redundant objects are resolved into a locally aligned form as illustrated in view 1210. In this way, the map alignment system 170 can improve the local accuracy of map data to within, for example, at least 0.15 meters for objects and other features of the map.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle 100 to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, distributed memories, cloud-based memories, other storage medium that are suitable for storing the disclosed data, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. As previously noted, while the map data is referred to in both FIGS. 1 and 2, in various embodiments, the map data 116 can be inclusive of the map data 260. Moreover, the map data 116 may be stored in the database 250 of FIG. 2 instead of the data stores 115 depending on a particular implementation. The map data 116 can include maps of one or more geographic areas. In some instances, the map data 116 can include data about roads, traffic control devices, road markings, structures, features, and/or landmarks in the one or more geographic areas. In some instances, the map data 116 can include aerial views of an area, topological data, point feature data, and so on. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116/260 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100 in, for example, a distributed memory.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., the present context).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data e.g., data about a present context. "Driving environment data" includes data or information about the external environment/surroundings in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the map alignment system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the map alignment system 170, and/or the autonomous driving module(s) 160 may control some or all of these vehicle systems 140 and, thus, may be partially or fully autonomous.

The processor(s) 110, the map alignment system 170, and/or the autonomous driving module(s) 160 can be operatively connected to communicate with the various vehicle systems 140 and/or individual components thereof. For example, returning to FIG. 1, the processor(s) 110, the map alignment system 170, and/or the autonomous driving module(s) 160 can be in communication to send and/or receive information from the various vehicle systems 140 to control the movement, speed, maneuvering, heading, direction, etc. of the vehicle 100. The processor(s) 110, the map alignment system 170, and/or the autonomous driving module(s) 160 may control some or all of these vehicle systems 140.

The processor(s) 110, the map alignment system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the map alignment system 170, and/or the autonomous driving module(s) 160 can control the direction and/or speed of the vehicle 100. The processor(s) 110, the map alignment system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels).

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160, in one embodiment, operates in conjunction with the map alignment system 170. Alternatively, in one embodiment, the autonomous driving module 160 is at least partially embodied within the map alignment system 170 as part of, for example, the mapping module 240. In either case, the autonomous driving module 160 may receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models and/or data elements that are used along with the map data 260. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the map alignment system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-2, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A map alignment system for locally aligning map data of a map, comprising:
one or more processors; a memory communicably coupled to the one or more processors and storing:
a segmenting module including instructions that when executed by the one or more processors cause the one or more processors to segment the map data that forms the map using a first grid to divide the map into a first set of tiles and a second grid to divide the map into a second set of tiles that are offset and overlap the first set of tiles; and
an alignment module including instructions that when executed by the one or more processors cause the one or more processors to analyze neighbor tiles in relation to a patch tile based, at least in part, on shared features between the patch tile and the neighbor tiles to identify external misalignments between one or more of the neighbor tiles and the patch tile,
wherein the neighbor tiles are from a different one of the first grid and the second grid in relation to the patch tile and overlap with the patch tile,
wherein the alignment module includes instructions to adjust alignment of the neighbor tiles within the map according to the misalignments for the one or more of the neighbor tiles; and
controlling the vehicle to navigate according to at least a current title and overlapping tiles from the first set and the second set, wherein the current tile is associated with a current position of the vehicle and the overlapping tiles overlap at least a portion of the current tile.

2. The map alignment system of claim 1, wherein the alignment module further includes instructions to, prior to analyzing the neighbor tiles, identify internal misalignments for tiles of the first set and of the second set by individually analyzing the tiles of the first set and the second set according to tile data that separately comprises the tiles,
wherein the alignment module includes instructions to individually adjust the tiles of the first set and the second set by correcting the internal misalignments to locally align separate data elements within the tiles of the first set and the second set, and
wherein the alignment module includes instructions to load the neighbor tiles and the patch tile into a memory upon selecting the patch from the map.

3. The map alignment system of claim 2, wherein the alignment module includes instructions to analyze the neighbor tiles in relation to the patch tile by correlating the shared features to identify the external misalignments for one or more of the neighbor tiles, and wherein the alignment module includes instructions to identify the internal misalignments by applying a simultaneous localization and mapping (SLAM) function to the tiles of the first set and the second set.

4. The map alignment system of claim 1, wherein the segmenting module further includes instructions to segment the map data into the first grid by generating the first grid using horizontal and vertical dividing lines to define the first set of tiles using a first grid structure, and wherein the segmenting module further includes instructions to segment the map data into the second grid by generating the second grid to be offset from the first grid to partially overlap tiles of the first set using a second grid structure.

5. The map alignment system of claim 1, wherein the alignment module further includes instructions to adjust the alignment by correcting the external misalignments between the patch tile and the neighbor tiles using locally identified errors between the patch tile and the neighbor tiles to reposition the neighbor tiles, and wherein the alignment module further includes instructions to adjust the alignment by modifying coordinates of the neighbor tiles to change respective locations within the map according to coordinate systems defined by the first grid and the second grid.

6. The map alignment system of claim 1, wherein the segmenting module further includes instructions to segment the map data in response to electronically retrieving the map data from a data store, wherein the map data is comprised of topological map information, and wherein the shared features are identifying aspects of the patch tile and the neighbor tiles.

7. The map alignment system of claim 1,
wherein the mapping module including instructions to load, into the memory of a vehicle, the current tile from one of the first set and the second set of tiles upon determining that the current tile is a closest one of the tiles of the first set and the second set to a current position of the vehicle, and wherein the mapping module further includes instructions to load, into the memory, the overlapping tiles from a different one of the first set and the second set in relation to the current tile.

8. A non-transitory computer-readable medium storing instructions that when executed by one or more processors cause the one or more processors to:
segment map data that forms a map using a first grid to divide the map into a first set of tiles and a second grid to divide the map into a second set of tiles that are offset and overlap the first set of tiles;
analyze neighbor tiles in relation to a patch tile based, at least in part, on shared features between the patch tile and the neighbor tiles to identify external misalignments between one or more of the neighbor tiles and the patch tile,
wherein the neighbor tiles are from a different one of the first grid and the second grid in relation to the patch tile and overlap with the patch tile;
adjust alignment of the neighbor tiles within the map according to the misalignments for the one or more of the neighbor tiles; and
control the vehicle to navigate according to at least a current tile and overlapping tiles from the first set and the second set, wherein the current tile is associated with a current position of the vehicle and the overlapping tiles overlap at least a position of the current tile.

9. The non-transitory computer-readable medium of claim 8, wherein the instructions to segment the map data include instructions to electronically retrieve the map data from a data store, wherein the map data is comprised of topological map information, wherein the shared features are identifying aspects of the patch tile and the neighbor tiles, and
wherein the instructions to segment the map data into the first grid include instructions to generate the first grid using horizontal and vertical dividing lines to define the first set of tiles, and wherein the instructions to segment the map data include instructions to generate the second grid to be offset from the first grid to partially overlap tiles of the first set using a second grid structure.

10. The non-transitory computer-readable medium of claim 8, wherein the instructions to adjust the alignment include instructions to correct the external misalignments between the patch tile and the neighbor tiles using locally identified errors between the patch tile and the neighbor tiles to reposition the neighbor tiles, and wherein the instructions to adjust the alignment include instructions to modify coordinates of the neighbor tiles to change respective locations within the map according to coordinate systems defined by the first grid and the second grid.

11. The non-transitory computer-readable medium of claim 8, wherein the instructions further include instructions to, prior to analyzing the neighbor tiles, identify internal misalignments for tiles of the first set and of the second set by individually analyzing the tiles of the first set and the second set according to data that separately comprises the tiles,
wherein the instructions further include instructions to individually adjust the tiles of the first set and the second set by correcting the internal misalignments to locally align separate data elements within the tiles of the first set and the second set.

12. The non-transitory computer-readable medium of claim 11, wherein the instructions to analyze the neighbor tiles include instructions to correlate the shared features to identify the external misalignments for the one or more of the neighbor tiles, and wherein the instructions to identify the internal misalignments include instructions to apply a simultaneous localization and mapping (SLAM) function to the tiles of the first set and the second set.

13. A method of locally aligning features within a map, comprising:
segmenting map data that forms the map using a first grid to divide the map into a first set of tiles and a second grid to divide the map into a second set of tiles that are offset and overlap the first set of tiles;
analyzing neighbor tiles in relation to a patch tile based, at least in part, on shared features between the patch tile and the neighbor tiles to identify external misalignments between one or more of the neighbor tiles and the patch tile,
wherein the neighbor tiles are from a different one of the first grid and the second grid in relation to the patch tile and overlap with the patch tile;
adjusting alignment of the neighbor tiles within the map according to the external misalignments for the neighbor tiles; and
controlling the vehicle to navigate according to at least a current tile and overlapping tiles from the first set and the second set, wherein the current tile is associated with a current position of the vehicle and the overlapping tiles overlap at least a portion of the current tile.

14. The method of claim 13, further comprising:
prior to analyzing the neighbor tiles, identifying internal misalignments for tiles of the first set and of the second set by analyzing the tiles of the first set and the second set according to tile data that separately comprises the tiles;
adjusting the tiles of the first set and the second set by modifying the tiles to correct the internal misalignments and to locally align separate data elements within the tiles; and
loading the neighbor tiles and the patch tile into a memory upon selecting the patch from the map.

15. The method of claim 14, wherein analyzing the neighbor tiles in relation to the patch tile includes correlating the shared features to identify the external misalignments for the one or more of the neighbor tiles, and wherein identifying the internal misalignments includes applying a simultaneous localization and mapping (SLAM) function to the tiles of the first set and the second set.

16. The method of claim 13, wherein segmenting the map data into the first grid includes generating the first grid using horizontal and vertical dividing lines to define the first set of tiles using a first grid structure, and wherein segmenting the map data into the second grid includes generating the second grid to be offset from the first grid to partially overlap tiles of the first set using a second grid structure.

17. The method of claim 13, wherein adjusting the alignment includes correcting the external misalignments between the patch tile and the neighbor tiles using locally identified errors between the patch tile and the neighbor tiles to reposition the neighbor tiles, and wherein adjusting the alignment includes modifying coordinates of the neighbor tiles to change respective locations within the map according to coordinate systems defined by the first grid and the second grid.

18. The method of claim 13, wherein segmenting the map data occurs in response to electronically retrieving the map data from a data store, wherein the map data is comprised of topological map information, and wherein the shared features are identifying aspects of the patch tile and the neighbor tiles.

19. The method of claim 13, further comprising:
loading, into a memory of a vehicle, a current tile from one of the first set and the second set of tiles upon determining that the current tile is a closest one of the tiles of the first set and the second set to a current position of the vehicle;
loading, into the memory, overlapping tiles from a different one of the first set and the second set in relation to the current tile, wherein the overlapping tiles ovlerap at least a portion of the current tile; and
controlling the vehicle to navigate according to at least the current tile and the overlapping tiles.

* * * * *

UNITED STATES PATENT AND TRADEMARK OFFICE
CERTIFICATE OF CORRECTION

PATENT NO. : 10,217,232 B2
APPLICATION NO. : 15/427263
DATED : February 26, 2019
INVENTOR(S) : Masahiro Harada It is certified that error appears in the above-identified patent and that said Letters Patent is hereby corrected as shown below:

In the Specification

Column 4, Line 8: Change "determines" to "determine"

Column 9, Line 5: Change "A shown" to "As shown"

Column 10, Line 20: Change "progress" to "progresses"

Column 10, Line 34: Change "transitions between" to "transitions, between"

Column 10, Line 64: Insert --230-- after "module"

Column 17, Line 14: Delete one instance of "can be configured"

In the Claims

Column 19, Line 27: Delete "controlling the vehicle" and add "a mapping module including instructions that when executed by the one or more processors cause the one or more processors to control a vehicle"

Column 20, Line 16: Change "a" to "the"

Column 20, Line 43: Change "the" to "a"

Column 21, Line 41: Change "the" to "a"

Column 22, Line 39: Change "a" to "the"

Signed and Sealed this
Ninth Day of July, 2019

Andrei Iancu
*Director of the United States Patent and Trademark Office*